United States Patent [19]

Lorenz et al.

[11] Patent Number: 5,142,440
[45] Date of Patent: Aug. 25, 1992

[54] METAL-CLAD, COMPRESSED GAS-INSULATED HIGH VOLTAGE STRUCTURE

[75] Inventors: Dieter Lorenz; Jurgen Haarhuis; Manfred Lieske, all of Berlin, Fed. Rep. of Germany

[73] Assignee: Siemens Aktiengesellschaft, Berlin & Munich, Fed. Rep. of Germany

[21] Appl. No.: 646,610
[22] PCT Filed: Mar. 6, 1989
[86] PCT No.: PCT/DE89/00149
    § 371 Date: Jan. 18, 1991
    § 102(e) Date: Jan. 18, 1991
[87] PCT Pub. No.: WO90/06008
    PCT Pub. Date: May 31, 1990

[30] Foreign Application Priority Data

Nov. 22, 1988 [DE] Fed. Rep. of Germany ....... 3839736

[51] Int. Cl.⁵ .............................................. H02B 5/00
[52] U.S. Cl. .................................. 361/335; 200/148 R; 361/332
[58] Field of Search ............... 200/144 R, 145, 148 R, 200/148 B; 361/332, 333, 335, 341, 355, 361

[56] References Cited

U.S. PATENT DOCUMENTS 1,870,959 8/1932 Morrison.
4,016,382 4/1977 Roth .................................... 200/148

FOREIGN PATENT DOCUMENTS 7233316 6/1974 Fed. Rep. of Germany.
2195535 3/1974 France.
558092 1/1975 Switzerland.

Primary Examiner—Gregory D. Thompson
Attorney, Agent, or Firm—Kenyon & Kenyon

[57] ABSTRACT

In the case of the metal-clad, compressed gas insulated high voltage structures, housings (1,7), whose longitudinal axes are positioned at angles to each other, must often be interconnected by way of an intermediate part (8). Two facility abutting rings (19,20) which have holes (22,32,23,33) respectively on an inner (21) and an outer (31) reference circle and which are interconnected at the inner reference circle (21) to the flange (9,10) of the housing as well as at the outer reference circle (31), serve as the intermediate part (8). The hole spacings $\beta_i$, $\beta_a$ of the holes on both reference circles are chosen to be different so that they are able to add up to 90° or 60° respectively. On one of the rings (20), the holes (32) on the outer reference circle (31) are designed as slots (32), whose length is determined by an $$\text{angle } \alpha = \frac{\beta_i \cdot \beta_a}{90} \text{ or } \frac{\beta_i \cdot \beta_a}{60}$$

By means of the intermediate part (8), all angles $\pm \alpha$ which lie in the range of $\pm 90°$ or $\pm 60°$ can be set between the longitudinal axes.

12 Claims, 5 Drawing Sheets

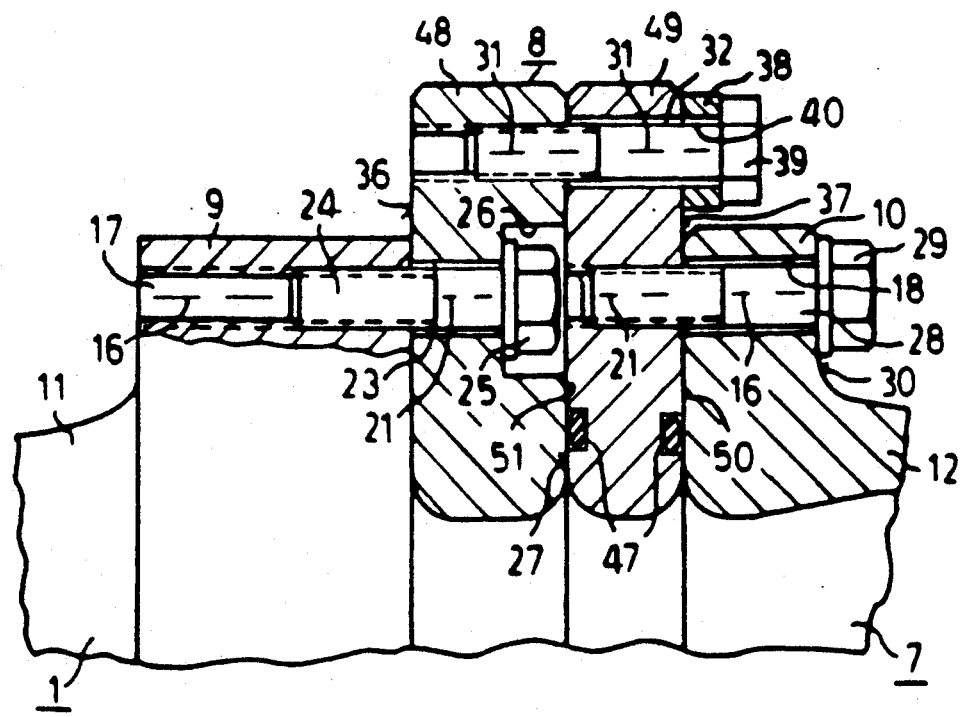

METAL-CLAD, COMPRESSED GAS-INSULATED HIGH VOLTAGE STRUCTURE

BACKGROUND OF THE INVENTION

The invention relates to a metal-clad, gas-pressurized-insulated high voltage structure having conductors or equipment are accommodated in housings. The conductors generally extend in the direction of the longitudinal axis of the housing. The housings to be interconnected have longitudinal axes positioned at angles to each other and are connected by way of a two-piece intermediate part. The housings are connected respectively to the two-piece intermediate part by way of flanges and fasteners which pass through these flanges.

This type of a metal-clad high voltage structure can consist of equipment comprised of a field circuit fixed within switchgear panels, and/or tubular conductors respectively accommodated in compressed gas insulated housings. The gas compressed insulated housings use $SF_6$ in particular. It is customary to accommodate the equipment which corresponds to the switchgear panels within the gas-pressurized-filled housings within more confined spaces, e.g. in buildings. On the other hand, the transformers or overhead power transmission lines are usually located outdoors and have terminals which are spaced considerably further apart from each other. The transformers or overhead power transmission lines can also be part of the high voltage structures. Gas-filled tubular conductors are generally used to connect the transformers or overhead power transmission lines. Thus, it becomes necessary to interconnect the housings whose longitudinal axes run at angles to each other. Tubular conductors, too, can have angles from 0° to 90° at junctions between the longitudinal axes of their housings or conductors. it DM-GM-72-33-316 teaches how to connect the housing and conductor, positioned at angles to each other by way of a two-piece intermediate part which is fastened with the aid of flanges to the housings to be interconnected so that specially adapted housings for knee points are not needed. Such housings may include the housings of the field circuit and/or of the tubular conductor. The conventional two-piece intermediate part consists of two spherical segments welded together. These segments, form the casing, as the housing, within which the conductors are interconnected in the center of the spheres. During initial assembly, the conventional two-piece intermediate part allows simple adaptation to the angles existing between the conductors to be connected. However, the intermediate part is permanently assigned this particular angle after the welding has been completed.

The present invention provides a two-piece intermediate part to connect angularly positioned housings of a metal-clad, compressed gas insulated high voltage structure such that the intermediate part can be easily adapted to the necessary angle. The present invention's two-piece intermediate part can be dismantled again at any time and can be adapted to another angle between 0° and 90°.

SUMMARY OF THE INVENTION

To resolve this task, a metal-clad, gas-pressurized-insulated high voltage structure of the above described type is designed according to the invention such that two facially abutting rings, which are sealed against each other and against a flange in a gastight manner, act as the intermediate part. The rings have tap holes or through-holes on an inner and an outer reference circle, and each ring is fastened to a flange of the housing by way of the tap or through-holes by means of the fasteners on the inner reference circle such that the rings are connected together by way of further fasteners on the outer reference circles of the same diameter. Thus, the diameter of the outer reference circles is so much greater than the outer diameter of the flange that the additional fasteners are located outside of the flange that the holes on both reference circles of the rings have a different hole spacing $\beta_i$, $\beta_a$, such that both hole spacings $\beta_i$, $\beta_a$, add up respectively to 90° or 60°; and that, on one of the rings, the holes on the outer reference circle are designed as slots whose length is determined by an angle $\gamma$ which results as the quotient of the product of the hole spacings $\beta_i$, $\beta_a$, divided by the range of 90° or 60°, to which both hole spacings add up respectively.

The connection between the housings of the high voltage structure having longitudinal axes or conductors running at angles to each other, thus, takes place by way of the normal flanges of the housings with the simple interpositioning of two facially abutting rings which are connected respectively to the flanges of the housing on the inner reference circles and together on the outer reference circles.

Since the different hole spacings $\beta_i$, $\beta_a$, of both reference circles of the rings add up to either 90° or 60° respectively, there are axes of symmetry which are located 90° to 60° apart around the entire circumference of the ring. On these axes of symmetry, one hole is positioned above the other, respectively. In contrast, an offset of varying magnitude appears between these axes of symmetry between the two holes of the ring without the slots. This offset can be defined as the angle $$\delta_n = (n-1)(\beta_i - \beta_a),$$

where n signifies whole numbers from 1 to $n_i$, whereby $n_i$ equals the number of holes on the inner reference circle in the region between the two axes of symmetry.

Furthermore, since slots are provided on one of the rings whose length corresponds to the angle relative to the range between the axes of symmetry such that $$\gamma = \frac{\beta_i \cdot \beta_a}{90} \text{ or } \gamma = \frac{\beta_i \cdot \beta_a}{60}$$

both rings are reciprocally able to slide or be adjusted in both directions so that an adjustment of the ring without slots results in each angle $\gamma$ located within the range between the axes of symmetry as a result of the offset assigned to each hole, whereby, with the aid of the slot on the other ring, both the holes assigned to the flange and to the ring on the inner reference circle and the holes with the rings on the outer reference circle align with each other so that they can receive the fasteners.

The gas-tightness of the connection is guaranteed thereby by appropriately selecting the hole spacing $\beta_i$ on the inner reference circle since the slots are located on the outer reference circle. Due to the greater circumference, there is still sufficient sealing surface available on the outer reference circle. In the case of this configuration, the gas seals required between the rings and at the flanges can be mounted in an arbitrary manner on one of the two faces of the rings or on the flanges.

At a selected range of 90° between the axes of symmetry, it is advantageous to mount the gas seals only on both faces of the ring with the slots. Then, the length of the slots can only amount to half of the angle γ. Namely, in this case, one achieves full displaceability by dropping the ring with the slots over two opposing axes of symmetry which form a diameter, whereby an inversion by 180° is obtained and the slots are then arranged in reverse.

The outer diameter of the two rings of the intermediate part can be of different sizes. In this case, the larger ring can be used when attaching additional fasteners, e.g. when fastening a support. The outer diameter of the flanges can also be different if the inner reference circles of the corresponding ring are adapted accordingly.

The flanges, to which the two-piece intermediate part is connected, can be located either on the face or on the lateral surface of the housing. Thus, the angle is located between the longitudinal axes of the housings to be interconnected at this level. A particularly simple design is obtained when the flanges of the housing have the same respective number of holes on the inner reference circle as when they were directly connected together. In this case, both rings would also have the same inner reference circle with the same number of holes.

The penetration of impurities or moisture through the slots can be prevented in a practical manner whereby the slots on the outer reference circle of the one ring are covered by an additional ring which is provided with holes according to the hole spacing and to the diameter of the holes on the outer reference circle of the outer ring of the intermediate part.

The present invention is still more closely explained in light of the FIGS. 1 to 8 of the exemplified embodiment shown in the drawing. As described, the present invention can be used both in single phase as well as in polyphase encased plants and tubular conductors.

BRIEF DESCRIPTION OF THE DRAWINGS

FIGS. 3 and 7 respectively show a longitudinal section through the housing flanges with the intermediate part, which is depicted in two easily modifiable designs.

FIG. 6 shows an additional principal configuration of the slots.

DESCRIPTION OF THE PREFERRED EMBODIMENTS

Figure 1:
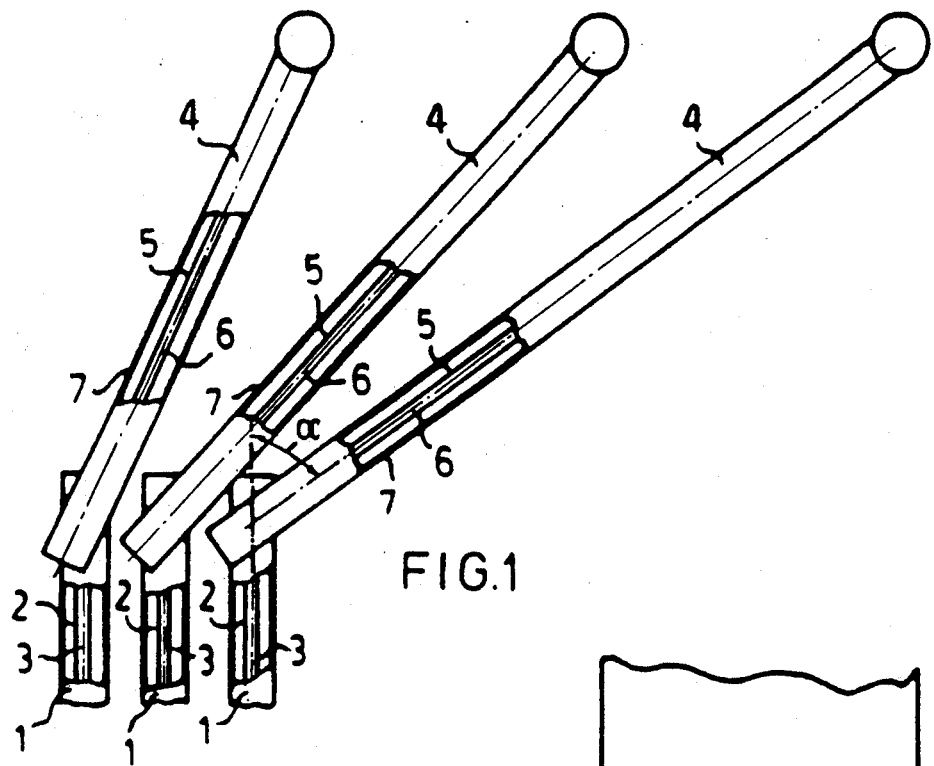
FIG. 1 shows, in a schematic representation, three single phase encased housings of a switchgear panel, which are connected via tubular conductors to additional separated terminals of a part of the plant (not shown).
Figure 2:
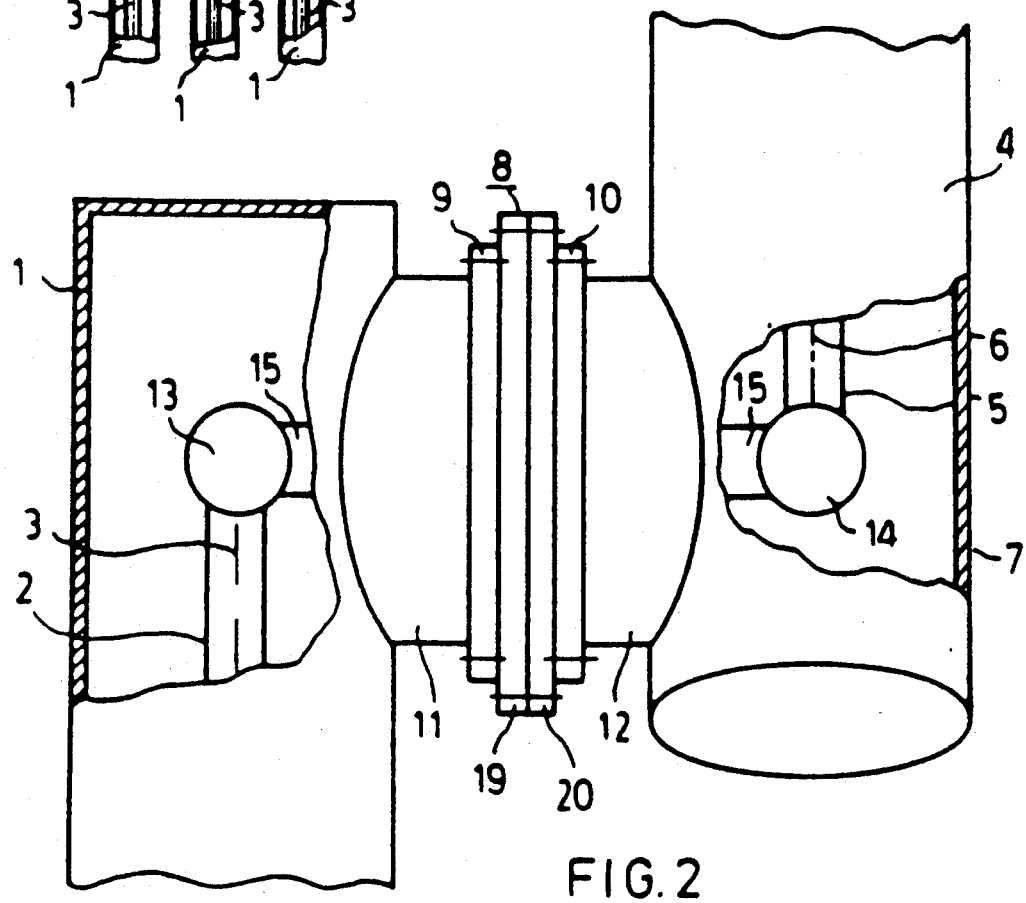
FIG. 2 shows a partially-sectioned side view of FIG. 1 in enlarged dimensions.

In the case of a single-phase, metal-clad high voltage structure which is pressure gas insulated using $SF_6$, the conductors (2) are connected to overhead power transmission line terminals (not shown) are accommodated in three closely neighboring switchgear panel housings 1 (c.f. FIG. 1). These belong to a field circuit of a switchgear panel of the high voltage structure and which run parallel to each other in the direction of the longitudinal axis 3 of the switchgear panel housing 1, as is indicated by dotted lines, and which have a considerably greater clearance from one another. The connection takes place respectively by way of single-phase tubular conductors 4, whose center conductors 5 also run in the direction of the longitudinal axis 6 of the conductor housing 7 as indicated by dotted lines. As a result of the greater distances between the overhead power transmission line terminals in comparison to the clearances between the switchgear panel housings 1, the conductors 2 in the switchgear panel housing 1 and the conductors 5 of the tubular conductors 4 are positioned at respective angles to each other. This angle α has another respective magnitude.

As can be seen in the lateral view of one of the switchgear panel housings 1 and the conductor housing 7 of the tubular conductor 4, which are interconnected, the connection takes place with the aid of a two-piece intermediate part 8 which is fastened to a flange 9 of the switchgear panel housing 1 and to the flange 10 of the conductor housing 7 of the tubular conductor 4. The flange 9 of the switchgear panel housing 1 is located on a support 11, which extends out from the switchgear panel housing 1 at right angles to its lateral surface. Accordingly, the flange 10 seals a support 12 of the housing 7. These respective supports 11 or 12, which extend perpendicularly out of the housings 1 or 7 respectively, are connected together by the two-piece intermediate part 8 such that the desired angle α is formed between the longitudinal axis 3 of the switchgear panel housing 1 and the longitudinal axis 6 of the conductor housing 7. The conductor in the switchgear panel housing 1 therefore terminates in a sphere 13, and the conductor 5 of the tubular conductor 4 terminates in a sphere 14. The connecting conductor 15, which is perpendicular both conductors 2 or 5. The connecting conductor passes through the center of the intermediate part 8 and the supports 11 and 12, and is located between both spheres 13, 14.

Figure 3:
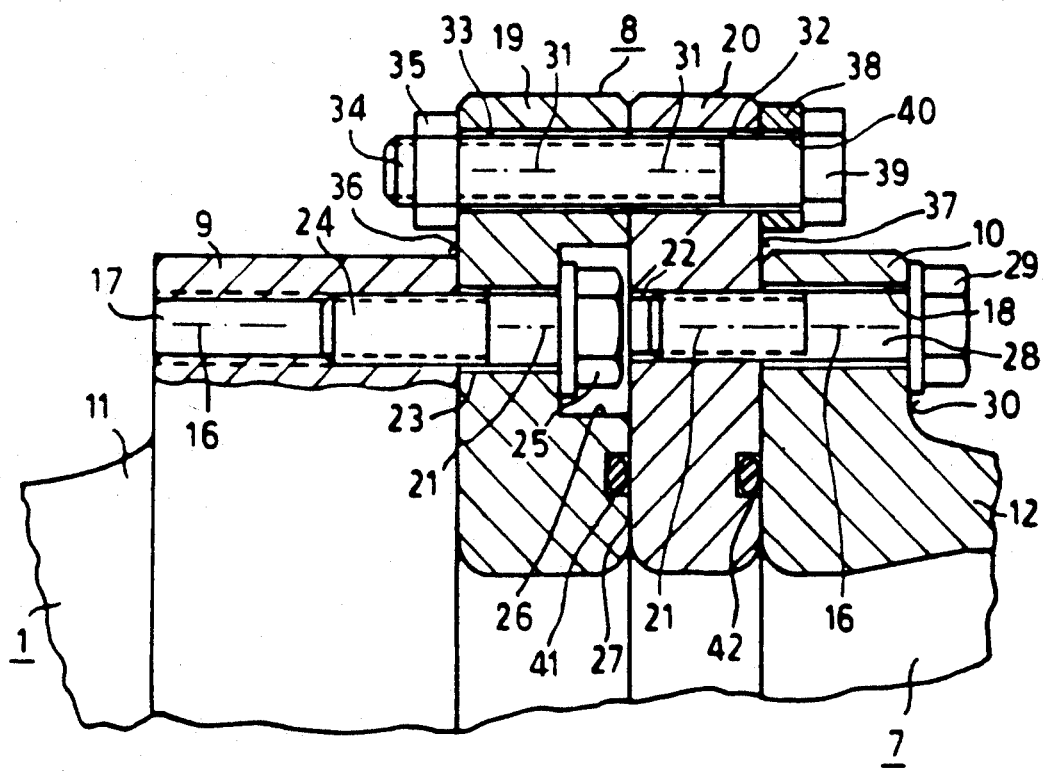

Both flanges, 9, 10 feature holes 17, 18 with the same hole spacing $\beta_{16}$ located on the same reference circle 16 (indicated in FIG. 3). Since these reference circles 16 also have the same respective diameters, the holes 17, 18 in the flanges 9, 10 are fashioned as though they could be directly connected to each other by the fasteners. However, their connection takes place by way of the two-piece intermediate part 8.

This two-piece intermediate part 8 consists of two rings 19, 20. The ring 19 is connected to the flange 9 and the ring 20 is connected to the flange 10. In addition, both rings 19, 20 have holes 22, 23 whose diameter and hole spacing $\beta_i$ match the diameter of the holes 17, 18 and the holes spacing $\beta_{16}$. The holes 22, 23 are located on an inner reference circle 21 (indicated in FIG. 3) that corresponds to the reference circle 16. The hole spacings $\beta_i = \beta_{16}$ are calculated according to the gas-tightness required of the flanges 9, 10.

Screws 24, pass through the traversing holes 23 of the ring 19 and are screwed into the holes 17 of the flange 9. These screws 24 are provided with threads and act as fasteners between the flange 9 and the ring 19. The heads 25 of the screws 24 are located in countersinkings 26 of the holes 23, which emanates from the interior face 27 of the ring 19. The other ring 20 is fastened to the flange 10 by screws 28. The screws 28 are screwed into holes 22 which are provided with threads. The screws 28 heads 29 are supported on the exterior face 30 of the flange 10. This configuration is advantageous since the screws 24 and 28 have the same dimensions.

Moreover, both rings 19, 20 of the intermediate part 8 are interconnected. For this purpose, the holes 32, 33 which are located in both rings 19, 20 on the same outer reference circle 31 (also indicated), are provided which are penetrated by the bolts 34 which serve as additional fasteners. The nuts 35 of the bolts 34 abut respectively the outer face 36 of the ring 19.

In contrast, additional rings 38 are provided on an opposite outer face 37 of the ring 20. These rings are located between the face 37 and the heads 39 of the bolts 34. This ring 38 also include holes 40 whose diameter and hole spacing correspond to those of the outer holes 33. The ring 38 serves to cover the holes 32 designed as slots 32 in the ring 20, so that they are protected from the penetration of impurities and moisture.

The gas-tightness of both rings 19, 20 of the intermediate port 8 is produced by a sealing ring 41 attached to the interior face 27 of the ring 19. An additional sealing ring 42 attached to the inner face 37 of the ring 20 seals the ring 20 against the flange 10.

Figure 4:
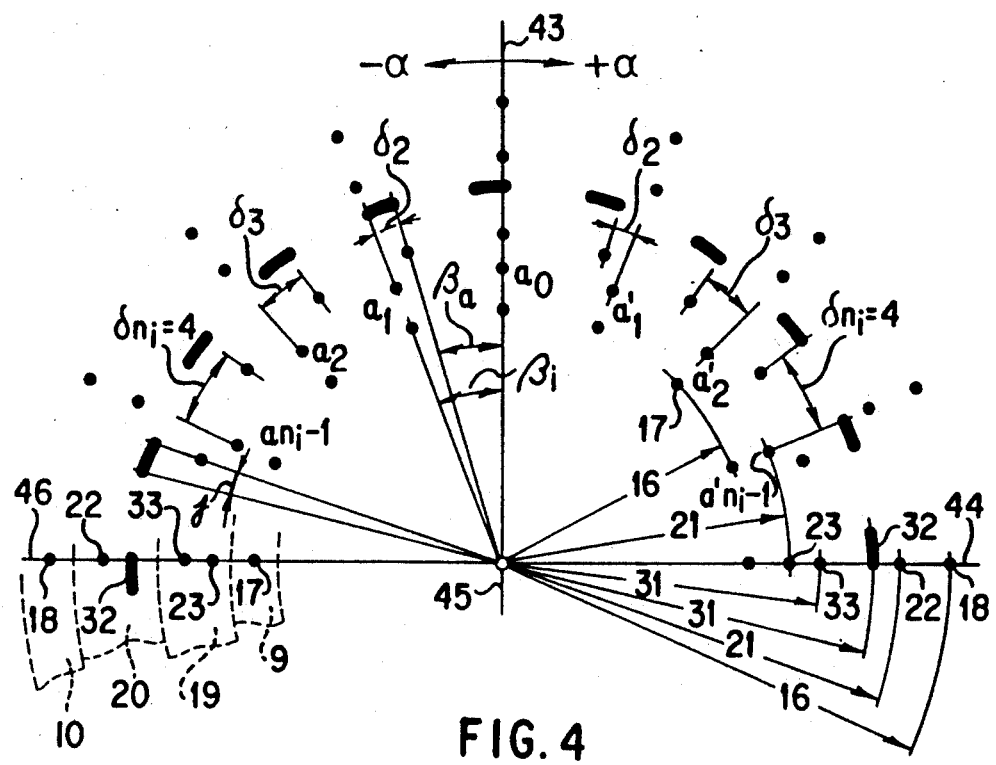
FIGS. 4, 5 and 8, show the reference circles on the flanges and the intermediate part with the hole or slot configurations in different variations.
Figure 5:
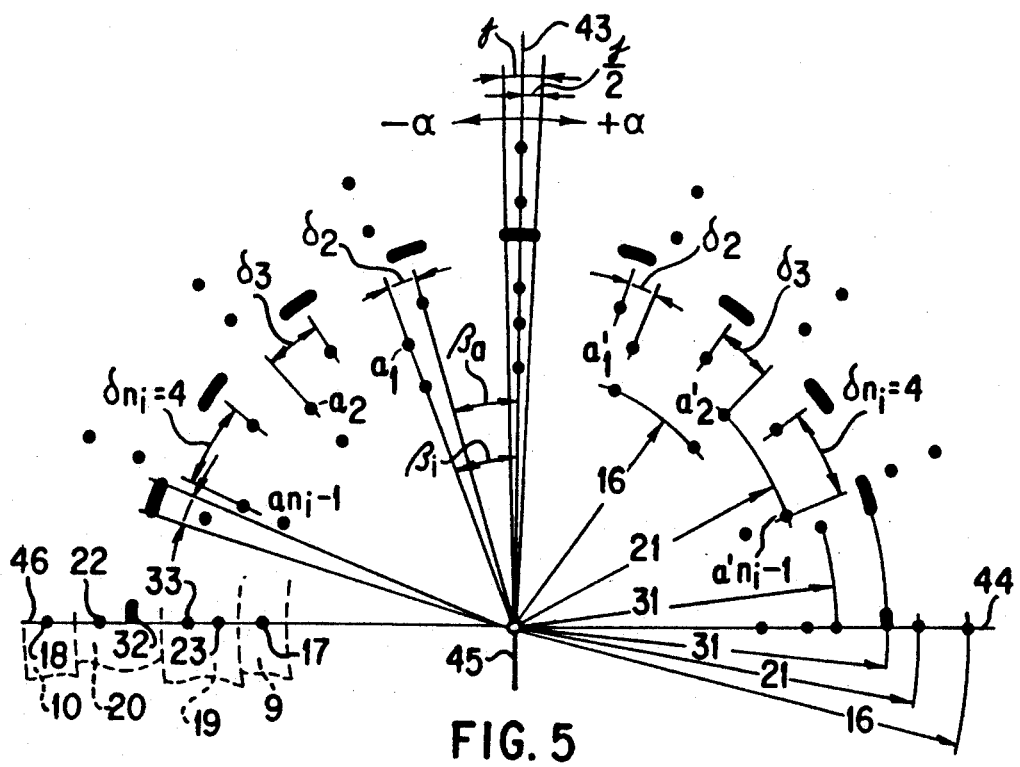

In order to achieve the angular variability of the connection between both housings 1 and 7 according to a random angle $\pm\alpha$ between the longitudinal axes 3 and 6, which should range between 0° and 90°, the following conditions are observed regarding the two-piece intermediate part 8:

The hole spacings $\beta_i$ and $\beta_a$ are selected such that they add up to 90°. This 90° angle also defines the range between the four axes of symmetry 43, 44, 45, 46. These axes of symmetry are perpendicular to each other (c.f. FIGS. 4 and 5), whereby the axes of symmetry 43, 45 run vertical and the axes of symmetry 44, 45 run horizontally and form a diameter respectively.

In this manner, a whole number $n_i$ or $n_a$ results from the holes 22, 32 or 23, 33 on the regions of the inner or outer reference circle 31, 31 of the rings 19, 20 which are located between the axes of symmetry 43, 44, 45, 46. Of course, the requisite gastightness must exist on the inner reference circles 21.

Consequently, the equation holds:

$$n_i \cdot \beta_i = 90° = n_a \cdot \beta_a$$

where $$n_i \neq n_a \text{ and } \beta_i \neq \beta_a$$

In FIG. 4, the distribution of the holes 17, 23, 32, 33, 22, 18 on the flange 9, the rings 19, 20 and the flange 10 of a particular exemplified embodiment is shown schematically with spread apart reference circles.

In this exemplified embodiment, the hole spacing on the inner reference circle 21 is selected to be $\beta_i = 22.5°$ and the hole spacing on the outer reference circle 31 to be $\beta_a = 18°$.

It follows from this that $n_i = 4$ and $n_a = 5$, so that both reference circles 21, 31 have a different amount of holes 22, 23; 32, 33 for the fasteners 24, 28 and the other fasteners 34.

Consequently, on the rings 19, 20, the holes 23, 33 or 22, 32 overlap only on the perpendicularly situated axes of symmetry 43, 44, 45, 46 lying 90° apart. In other words, only after 90°, are both holes 23, 33 or 22, 32 of a ring 19, 20 located on the same radius.

As an offset (angle $\delta$) between the holes 23 of the inner reference circle 21 and the holes 33 of the outer reference circle 31 on the ring, the equation holds:

$$\delta n = (n-1)(\beta_i - \beta_a).$$

whereby n respectively signifies whole number up to $n_i$; i.e., from one to four.

Therefore, $$\delta = 0°$$

$$\delta_2 = (2-1)(22.5° - 18°) = 4.5.$$

$$\delta_3 = (3-1)(22.5° - 18°) = 9°$$

$$\delta_4 = (4-1)(22.5° - 18°) = 13.5°$$

On the outer reference circle 31 of the ring 20, the outer holes 32 are designed as slots 32. Their length is represented by the angle at a radius $$= \frac{\beta_i \cdot \beta_a}{90°} = \frac{22.5° \cdot 18°}{90°} = 4.5°$$

Accordingly, for each offset, namely at each angle $\delta$ divided by the present five slots 32 which permit one additional displacement of both rings 19, 20 against each other, there are an additional five adjustable angular ranges so that overall, a number $$z = n_i \cdot n_a = 4 \cdot 5 = 20$$

of adjustable angular regular ranges result for the angle $\pm\alpha$. The angle $\alpha$, i.e., the given angle between the longitudinal axes of the housings 1, 7, is counted respectively with the upper vertical axis of symmetry 43. Table 1 shows the one specific offset $\delta$ of the respective assigned adjustable angular ranges.

The designations $$a_0, a_1 \ldots a_{n_i - 1}$$

or $$a'_0, a'_1 \ldots a'_{n_i - 1}$$

are assigned to the holes 23 of the ring 19 according to FIG. 4 in Table 1.

TABLE 1

| | $\alpha°$ (Angle) | | | |
|---|---|---|---|---|
| $\delta_1 = 0°$ | $\delta_2 = 4.5°$ | $\delta_3 = 9°$ | $\delta_4 = 13.5°$ | |
| ($a_0$ over X) | ($a_1$ over X) | ($a_2$ over X) | ($a_3$ over X) | |
| 0°–4.5° | 4.5°–9° | 9°–13.5° | 13.5°–18° | |
| 18°–22.5° | 22.5°–27° | 27°–31.5° | 31.5°–36° | $n_a$ |
| 36°–40.5° | 40.5°–45° | 45°–49.5° | 49.5°–54° | |
| 54°–58.5° | 58.5°–63° | 63°–67.5° | 67.5°–72° | |
| | $n_i$ | | | |

It can be seen in Table 1 that the range 0 to ±90° is completely covered, so that an overall variability range of 180° is provided by arranging the ring 19 according to the offset $\delta$ on the upper vertical axis of symmetry 43, which e.g., is supposed to correspond to the longitudinal axis 3, and by rotating both rings 19, 20 against each other in two different directions, which is made possible by the slot 32.

With reference to the exemplified embodiment shown in FIGS. 3 and 4, the adjustment of the intermediate part 8 is undertaken as follows:

It is assumed that the angle $\alpha$ between the longitudinal axis 3 of the housing 1 and the longitudinal axis 6 of the housing 7 of the tubular conductor 4 amounts to 30°.

A particular hole 17 on the flange 9 of the switchgear panel housing 1 is selected whose center is assigned to the axis of symmetry 43 and to the longitudinal axis 3 (c.f. FIG. 4).

From Table 1 it can be seen that the angle $\alpha = 30°$ is located in an angular range which is assigned to the offset $\delta_3 = 9°$ such that the hole 23 which is marked $a_2$ on the ring 19 must be brought into alignment with the hole 17 on the flange 9, which is looked upon as the axis of symmetry or as the longitudinal axis. The ring 19 can then be fastened onto the flange 9 with the aid of the screws 24.

If the ring 20 is additionally secured to the ring 19 with the aid of the bolt 34, then, while utilizing the length of the slots 32, an alignment of the holes 22 and with the holes 18 can be achieved on the flange 10 such that one can secure the flange 10 to the ring 20 in a simple manner with the aid of the screws 28.

In the case of the exemplified embodiment shown in FIG. 4, the slots 32 on the ring 20 are arranged such that the outer edge of a slot 32 is located at each axis of symmetry 43, 44, 45, 46. FIG. 5 shows a somewhat modified exemplified embodiment with the same hole spacings $\beta_i = 22.5°$ on the inner reference circle 21 and 62 $_a = 18°$ on the outer reference circle 31 of the rings 19,20.

In the case of this exemplified embodiment, the center of the slots 32 are placed respectively on the respective axes of symmetry 43, 44, 45, 46 in order to maintain a symmetrical arrangement of the slots 32 in the range of $+\alpha = 90°$ to $-\alpha = 90°$, i.e., a total range of 180°.

Thus, for the number of adjustable angular ranges it holds that $$z = n_i \cdot n_a + 1 = 4 \cdot 5 + 1 = 21.\text{ps}$$

The position of the adjustable angular ranges, which are assigned to the individual offset values $\delta_1, \delta_2, \delta_3$ and $\delta_4$, changes accordingly; c.f. Table 2.

TABLE 2

| | $\alpha°$ | | | |
|---|---|---|---|---|
| $\delta_1 = 0°$ | $\delta_2 = 4.5°$ | $\delta_3 = 9°$ | $\delta_4 = 13.5°$ | |
| ($a_0$ over X) | ($a_1$ over X) | ($a_2$ over X) | ($a_3$ over X) | |
| 0°–2.25° | 2.25°–6.75° | 6.75°–11.25° | 11.25°–15.75° | |
| 15.75°–20.25° | 20.25°–24.75° | 24.75°–29.25° | 29.25°–33.75° | $n_a$ |
| 33.75°–38.25° | 38.25°–42.75° | 42.75°–47.25° | 47.25°–51.75° | |
| 51.75°–56.25° | 56.25°–60.75° | 60.75°–65.25° | 65.25°–69.75° | |
| 69.75°–74.25° | 74.25°–78.75° | 78.75°–83.25° | 83.25°–87.75° | |
| 87.25°–92.25° | | | | |
| | $n_i$ | | | |

The alignment of the ring 19 with the displace holes 23, 33 on the axis of symmetry 43 is performed in the manner described previously according to the desired angle $\alpha$ with the aid of the values given in Table 2.

Figure 8:
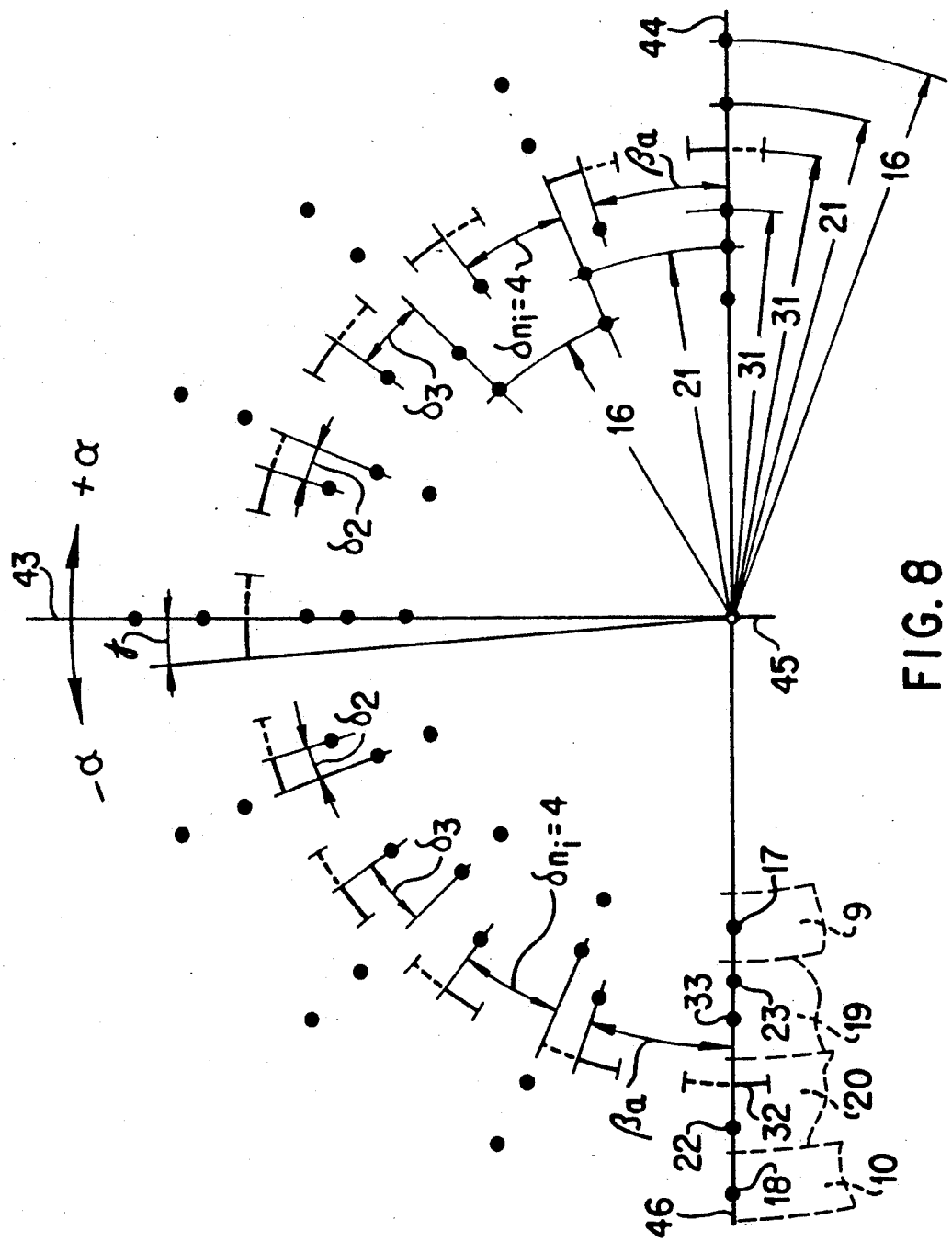

In FIGS. 6, 7 and 8, an additional modified exemplified embodiment is shown whereby the same reference symbols have been retained for the same parts. The intermediate part 8, which is shown in FIG. 7, basically corresponds to that shown in FIG. 3; only the sealing conditions have been altered. In the exemplified embodiment according to FIG. 7, the sealing rings 47 are located only in the ring 49 of the intermediate part 8, which has the slots 32. The ring 48 with the holes 23, 33, in contrast, does not have any sealing rings.

Since the same sealing surface conditions are created on both of the processed outer surfaces of the ring 48, i.e., the outer face 50 and the inner face 51, the ring 48 can be turned around, i.e., turned by a diameter of approximately 180°, without changing the sealing conditions. This means that when choosing axes of symmetry 43, 44, 45, 46 which are spaced 90° apart, whereby both hole spacings $\beta_i$ and $\beta_a$ add up to 90°, respectively, the turning takes place via the opposing horizontal axes of symmetry 44, 46. In this case, one can decrease the length of the slots 32, namely by the factor 2, so that the angle $$\gamma' = \frac{\beta_i \cdot \beta_a}{(2)(90)} = 2.25°$$

Thus, one obtains a greater remainder of flange surface on the outer reference circle 31 of the ring 48 with the slots 32.

By rotating 180°, the result is obtained that the slots 32 mirror each other and the entire adjustment range is covered by the smaller slots. This may be seen in the FIGS. 6 and 8, wherein the position of the slots 32 to the axes of symmetry 43, 44, 45, 46 is respectively aligned such that an outer edge of the slot 32 is located on the axis of symmetry. After turning the ring 180° by way of both axes of symmetry 44, 46, which lie opposite each other, the slots 32 assume the position indicated by the dotted lines. The angular range corresponding to the desired angle $\alpha$ can again be taken from Table 1.

We claim:

1. A metal clad, compressed gas-insulated high voltage structure having:
   a plurality of housings, each of said housings having a longitudinal axis and accommodates a conductor; whereby housings may be interconnected, such that the longitudinal axis of one housing is at an angle with respect to the longitudinal axis of an other housing, by a two-piece intermediate part wherein each of the interconnected housings are connected to a respective intermediate part by a flange and a plurality of fasteners, where a respective one of said plurality of fasteners passes through said flange, said intermediate part comprising:
   two facially abutting rings which are sealed in a gas-tight manner against each other and against a respective flange;
     each of said rings have either threaded or non-threaded holes having the same diameter along an inner reference circle and an outer reference circle such that each of said rings is secured to a respective flange with fasteners which utilize the holes along said inner reference circle and such that said rings are connected with each other with additional fasteners along said outer reference circle wherein
   the diameter of said outer reference circle is greater than the diameter of a third reference circle on the outer diameter of each of the flanges such that said additional fasteners are located at portions of said rings that are radially outward of said third reference circle of said flanges and wherein
   the holes on both the inner and the outer reference circles of the rings have a different hole spacing $\beta_i, \beta_a$ such that both hole spacings $\beta_i, \beta_a$ may add up to either 90° or 60° respectively; and that on one of said rings, the holes on the outer reference circle are designed as slots having a length determined by an angle $\gamma$, said angle $\gamma$ is the quotient of the product of the hole spacings $\beta_i, \beta_a$ divided by a range of either 60° or 90° to which the hold spacings add up respectively.

2. The metal-clad, compressed gas-insulated, high voltage structure according to claim 1, wherein at a selected range of 90° between the axes of symmetry, only the ring with the slots has gas seals and the length of the slots only corresponds to half the angle $\gamma$.

3. The metal-clad, compressed gas-insulated, high voltage structure according to claim 1 or 2, wherein one of the rings is provided on one side with countersinkings on the inner reference circle to receive the heads of the fasteners.

4. The metal-clad, compressed gas-insulated, high voltage structure according to claim 1 or 2, wherein the countersinkings are located on the ring without slots.

5. The metal-clad, compressed gas-insulated, high voltage structure according to claim 1 or 2, wherein the slots on the outer reference circle of the one ring are covered by an additional ring, which is provided with holes according to the hole spacing, $\beta_a$ and to the diameter of the holes on the outer reference circle of the other ring.

6. The metal-clad, compressed gas-insulated, high voltage structure according to claim 5, wherein at least one of the flanges of the housing, which are to be connected to the intermediate part, is located on support which is positioned on the lateral surface; and the conductor, which extends in the longitudinal direction of the housing, is run perpendicular to this flange.

7. A metal-clad, compressed gas-insulated, high voltage structure having:
a plurality of housings each of said housings having a longitudinal axis and accommodates a conductor, said plurality of housings includes:
a first housing having a first longitudinal axis and accommodating a first conductor; and
a second housing having a second longitudinal axis and accommodating a second conductor;
wherein said first housing and second housing are connected via a first flange, a two-piece intermediate part, and a second flange such that said first longitudinal axis is at an angle $\theta$ with said second longitudinal axis
wherein said two-piece intermediate part comprises:
a first ring having a first plurality of inner holes disposed along a first inner circle at a radius $R_i$ from the center of said first ring and a first plurality of outer holes disposed along a first outer circle at a radius $R_o$ from the center of said first ring; and
a second ring having a second plurality of inner holes disposed along a second inner circle at a radius $R_i$ from the center of said second ring and a second plurality of outer holes disposed along a second outer circle at a radius $R_o$ from the center of said second ring,
such that said first ring and said second ring are connected by a plurality of additional fasteners being disposed through respective pairs of said first plurality of outer holes and said second plurality of outer holes;
said first flange having a plurality of first flange holes disposed along a circle at a radius $R_i$ from the center of said first flange such that said first flange is connected with said first ring by a plurality of first fasteners being disposed in respective pairs of said plurality of first flange holes and said first plurality of inner holes;
said second flange having a plurality of second flange holes disposed along a circle at a radius $R_i$ from the center of said second flange such that said second flange is connected with said second ring by a plurality of second fasteners being disposed in respective pairs of said plurality of second flange holes and said second plurality of inner holes,
wherein $R_o$ is greater than $R_i$ and $R_o$ is greater than the outer radius of both said first flange and said second flange and
wherein both said first plurality of inner holes and said second plurality of inner holes have a hole spacing $\beta_i$ and both said first plurality of outer holes and second plurality of outer holes have a hole spacing $\beta_a$, not equal to $\beta_i$, such that multiples of both hole spacings $\beta_i$ and $\beta_a$ may be added up to either 90° or 60° and that said second plurality of outer holes are slots having a length determined by an angle $\gamma$ and radius $R_o$, said angle $\gamma$ is the quotient of the product of the hole spacings $\beta_i, \beta_a$ divided by either the range 90° or 60° to which both hole spacings $\beta_i, \beta_a$ add up respectively.

8. The metal-clad, compressed gas-insulated, high voltage structure according to claim 7, wherein at a selected range of 90° between axes of symmetry, only said second ring has gas seals and the length of the slots corresponds to half of said angle $\gamma$.

9. The metal-clad, compressed gas-insulated, high voltage structure according to claim 7 or 8, wherein one of said first or second rings is provided on one side with countersinkings on radius $R_i$ to receive the heads of said plurality of first or second fasteners.

10. The metal-clad, compressed gas-insulated, high voltage structure according to claim 9, wherein said countersinkings are located on the said first ring.

11. The metal-clad, compressed gas-insulated, high voltage structure according to claims 7 or 8 wherein said slots disposed along radius $R_o$ of said second ring are covered by additional rings, provided with holes according to the hole spacing $\beta_a$ and to the diameter of the holes disposed on radius $R_o$ on said first ring.

12. The metal-clad, compressed gas-insulated, high voltage structure according to claim 11, wherein at least one of said first and second flanges is positioned adjacent to a first or second support positioned on the respective one of said first and second housing's lateral surface; and the respective one of said first and second conductors extends in the longitudinal direction of the respective one of said first and second housing, and housing perpendicular to the respective one of said first and second flange.

* * * * *